US012366820B2

(12) United States Patent
Haba

(10) Patent No.: US 12,366,820 B2
(45) Date of Patent: Jul. 22, 2025

(54) IMAGE FORMING APPARATUS

(71) Applicant: Kazuki Haba, Tokyo (JP)

(72) Inventor: Kazuki Haba, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/407,471

(22) Filed: Jan. 9, 2024

(65) Prior Publication Data

US 2024/0248430 A1 Jul. 25, 2024

(30) Foreign Application Priority Data

Jan. 23, 2023 (JP) ................................. 2023-008238
Nov. 24, 2023 (JP) ................................. 2023-199463

(51) Int. Cl.
*G03G 15/00* (2006.01)
*G03G 15/20* (2006.01)

(52) U.S. Cl.
CPC ....... *G03G 15/607* (2013.01); *G03G 15/2017* (2013.01); *G03G 2215/00645* (2013.01); *G03G 2215/00679* (2013.01)

(58) Field of Classification Search
None
See application file for complete search history.

(56) References Cited

U.S. PATENT DOCUMENTS

2007/0132174 A1* 6/2007 Yamane ............ G03G 15/6576 271/188
2009/0003912 A1* 1/2009 Nagasaki ........... G03G 15/6576 399/406
2015/0010337 A1* 1/2015 Morinaga .......... G03G 15/2021 399/341
2015/0077456 A1 3/2015 Idehara et al.

FOREIGN PATENT DOCUMENTS

JP 11119489 A * 4/1999
JP 2006-094090 A 4/2006
JP 2015-054504 A 3/2015
JP 2016-090730 A 5/2016

OTHER PUBLICATIONS

English abstract of JP 11-119489 A to Sato, publication date Apr. 30, 1999. (Year: 1999).*

* cited by examiner

*Primary Examiner* — Leslie J Evanisko
(74) *Attorney, Agent, or Firm* — XSENSUS LLP

(57) ABSTRACT

An image forming apparatus includes a first sensor to detect at least one of a position of an image on a sheet or a length of the sheet; a first conveyor upstream or downstream of the first sensor in a conveyance direction; a fixing device; and circuitry. The first conveyor includes: a rubber belt; a driving roller within the rubber belt to rotate the rubber belt; a driven roller outside the rubber belt and driven by the rubber belt to convey the sheet in the conveyance direction; and a second sensor to measure a rotational speed of the driven roller. The fixing device is upstream of the first conveyor in the conveyance direction. The fixing device fixes toner onto the sheet. The circuitry is configured to control the first conveyor to convey the sheet at a target linear speed based on the rotational speed measured by the second sensor.

5 Claims, 7 Drawing Sheets

1000

IMAGE FORMING APPARATUS

CROSS-REFERENCE TO RELATED APPLICATIONS

This patent application is based on and claims priority pursuant to 35 U.S.C. § 119(a) to Japanese Patent Application No. 2023-008238, filed on Jan. 23, 2023 and Japanese Patent Application No. 2023-199463, filed on Nov. 24, 2023 in the Japan Patent Office, the entire disclosure of which is hereby incorporated by reference herein.

BACKGROUND

Technical Field

Embodiments of the present disclosure relate to an image forming apparatus.

Related Art

In a sheet cooling processes, a known technique uses a heat pipe roller as the driven roller. To increase a contact area between the heat pipe roller and a sheet more than a nip between rollers, a rubber belt is used on the driving side. This configuration enhances cooling performance. In order to control the temperature of a rotating cooling unit such as a heat pipe roller, a disclosed configuration measures the temperature of a proximity member and control the cooling unit based on the temperature.

However, when using a rubber belt to convey paper, the use of a thin rubber belt leads to variations in, for example, thickness, circumference, and surface properties due to environmental factors, aging, and individual differences. These variations interfere with achieving a consistent linear speed for stable paper conveyance. When a paper detection system is positioned upstream or downstream of the conveyance path, the variations in speed might result in detection errors. In such a technique, when a rubber belt is employed in the drive mechanism of a heat pipe roller, variations may occur in the linear speed of paper conveyance.

SUMMARY

An embodiment of the present disclosure provides an image forming apparatus includes a first sensor to detect at least one of a position of an image on a sheet or a length of the sheet; a first conveyor upstream or downstream of the first sensor in a conveyance direction; a fixing device; and circuitry. The first conveyor includes: a rubber belt; a driving roller within the rubber belt to rotate the rubber belt; a driven roller outside the rubber belt and driven by the rubber belt to convey the sheet in the conveyance direction; and a second sensor to measure a rotational speed of the driven roller. The fixing device is upstream of the first conveyor in the conveyance direction. The fixing device fixes toner onto the sheet. The circuitry is configured to control the first conveyor to convey the sheet at a target linear speed based on the rotational speed measured by the second sensor.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1A:
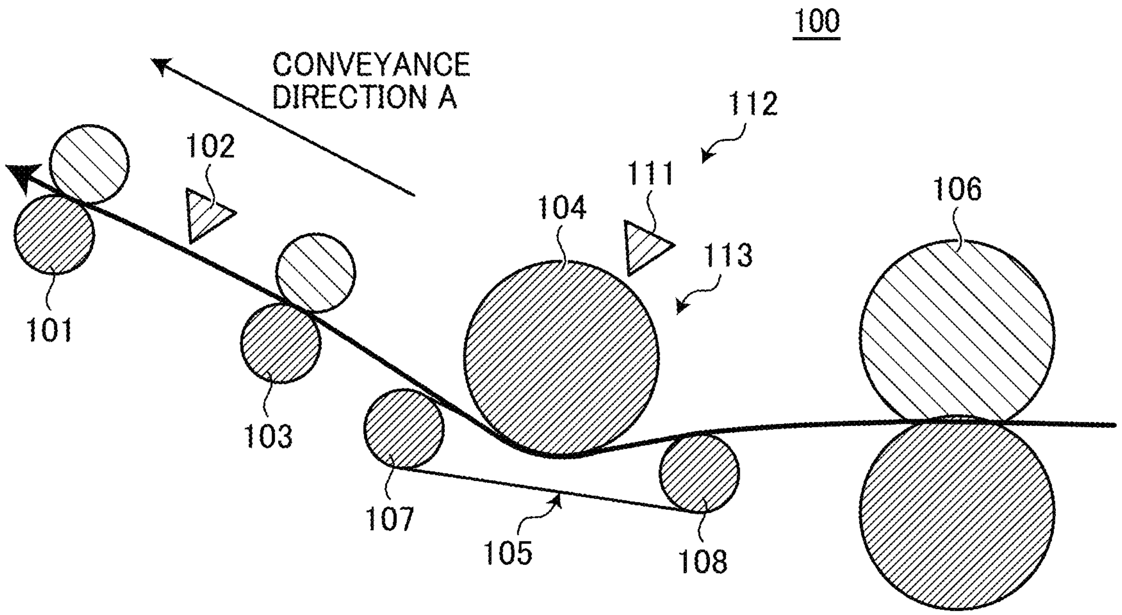
FIG. 1A is a diagram of a sheet conveyor included in an image forming apparatus, according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

According to one aspect of the present disclosure, the detection accuracy of the position of images and paper can be enhanced.

Embodiments of an image forming apparatus are described with reference with the accompanying drawings.

FIG. 1A is a diagram of a sheet conveyor 100 included in an image forming apparatus 1000, according to an embodiment of the present disclosure. As illustrated in FIG. 1A, a sheet conveyor included in an image forming apparatus according to an embodiment of the present disclosure a detection downstream roller 101, a detector 102, a detection upstream roller 103, a heat pipe roller 104, a conveyor rubber belt 105, a fixing roller 106, a driving roller 107, and a driven roller 108.

The detector 102 includes a line sensor to detect the position of an image on a sheet. The detector 102 serves as a first sensor. The detection downstream roller 101 is placed downstream of the detector 102 in a conveyance direction A of a sheet. The detection upstream roller 103 is placed upstream of the detector 102 in the conveyance direction A. The sheet conveyor of the image forming apparatus according to an embodiment of the present disclosure serves as a detector to detect the rotational speed of the detection downstream roller 101 using, for example, an encoder and a transmissive sensor, and detect or measure the length of the sheet based on the detected rotational speed.

In other words, the detector 102 is located downstream of a cooler (e.g., the heat pipe roller 104), which uses the drive of the conveyor rubber belt 105, in the conveyance direction A. Further, the detector 102 serves as a detector between rollers (e.g., the detection downstream roller 101 and the detection upstream roller 103), which are located downstream and upstream of the detector 102 in the conveyance direction A. The detection downstream roller 101 and the detection upstream roller 103 are located downstream and upstream of the detector 102 in the conveyance direction A, respectively. The detection downstream roller 101 and the detection upstream roller 103 serve as a second conveyor that conveys a sheet using a roller alone. In other words, the second conveyor includes a first roller (e.g., the detection upstream roller 103) upstream of the first sensor (e.g., the detector 102) in the conveyance direction A and a second roller (e.g., the detection downstream roller 101) of the first sensor in the conveyance direction A. The first roller and the second roller convey the sheet in the conveyance direction.

The heat pipe roller 104, the driving roller 107, and the driven roller 108 are located upstream of the detector 102 in the conveyance direction A. The heat pipe roller 104, the driving roller 107, and the driven roller 108 serve as a first conveyor 112 (see FIG. 1B) that conveys a sheet using the conveyor rubber belt 105. The conveyor rubber belt 105 serves as a rubber belt. In the present embodiment, the heat pipe roller 104, the driving roller 107, and the driven roller 108 are located upstream of the detector 102 in the conveyance direction A. Alternatively, the heat pipe roller 104, the driving roller 107, and the driven roller 108 are located downstream of the detector 102 in the conveyance direction A. The heat pipe roller 104 serves a cooler that cools the sheet heated by the fixing device. The heat pipe roller 104 serves as a driven roller that rotates through the conveyor rubber belt 105 serving as a rubber belt, by the rotation of the driving roller 107.

The first conveyor 112 includes: a rubber belt (e.g., the conveyor rubber belt 105); a driving roller 107 within the rubber belt to rotate the rubber belt; a driven roller (e.g., the heat pipe roller) contacting the rubber belt and driven by the rubber belt to convey the sheet in the conveyance direction A; and a second sensor (e.g., the measurement section 111) to measure a rotational speed of the driven roller.

The fixing roller 106 serves as a fixing device located upstream of the heat pipe roller 104 serving as a cooler in the conveyance direction A, to fix toner onto a sheet by generating heat. The fixing roller 106 and the heat pipe roller 104 are driven separately from each other to enable conveyance.

Figure 1B:
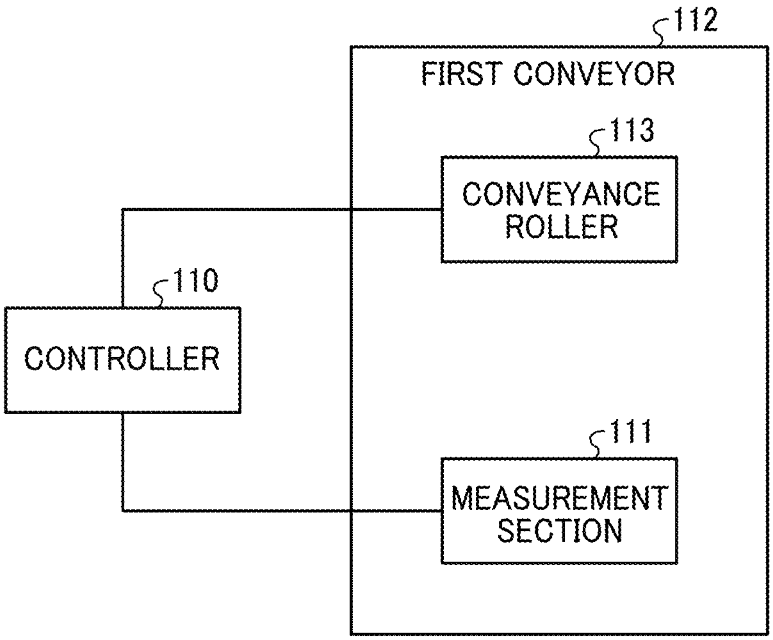
FIG. 1B is a block diagram of a hardware configuration of a sheet conveyor included in an image forming apparatus, according to an embodiment of the present disclosure.
Figure 1C:
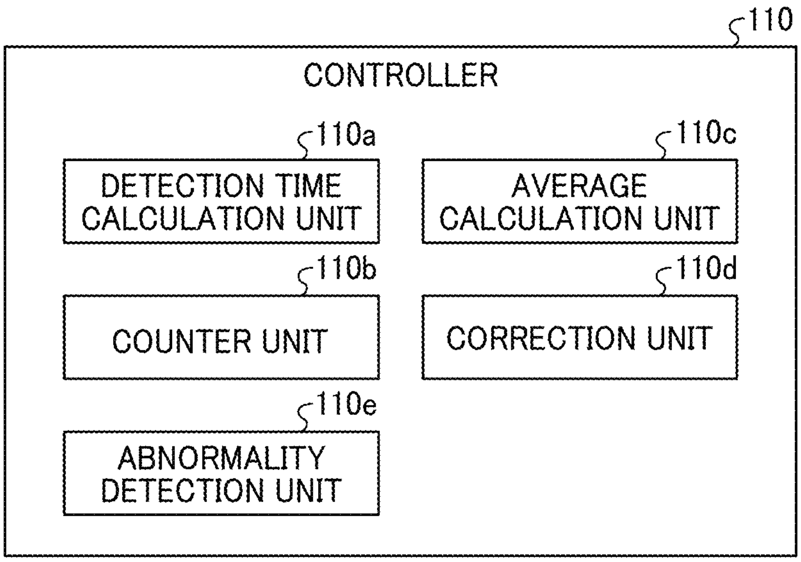
FIG. 1C is a block diagram of a functional configuration of a controller of a sheet conveyor included in an image forming apparatus, according to an embodiment of the present disclosure.

FIG. 1B is a block diagram of a hardware configuration of a sheet conveyor included in an image forming apparatus, according to an embodiment of the present disclosure. FIG. 1C is a block diagram of a functional configuration of a controller of a sheet conveyor included in an image forming apparatus, according to an embodiment of the present disclosure. In the present embodiment, the sheet conveyor 100 includes a controller 110 and a first conveyor 112 as illustrated in FIG. 1B. The first conveyor 112 includes a conveyance roller 113 and a measurement section 111 (or a second sensor). The conveyance roller 113 includes the heat pipe roller 104, the driving roller 107, and the driven roller 108.

The heat pipe roller 104 is a cooling member that includes a heat pipe and a heat dissipation fin. The heat pipe serves as a heat absorber to absorb the heat of the sheet. The heat dissipation fin dissipates the heat of the heat pipe. The sheet conveyor includes a cooling fan and a cooling controller. The cooling fan is a blower fan to increase the heat dissipation efficiency from the heat dissipation fin and generate an airflow to lower the temperature of the heat pipe roller 104. The cooling controller controls the rotational speed of the cooling fan. The cooling controller also controls the operation (e.g., the rotational speed) of the cooling fan to cool down the sheet.

Figure 7:
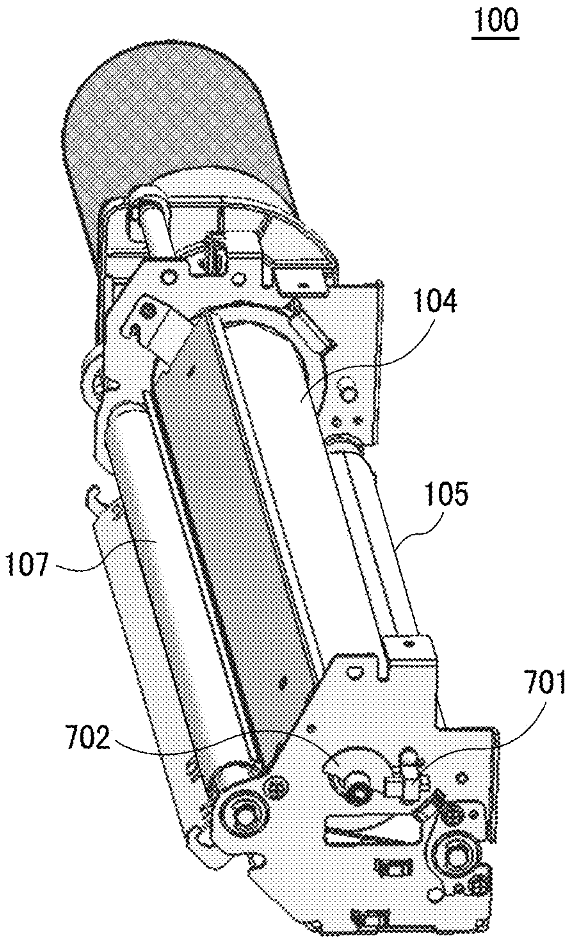
FIG. 7 is a diagram of parts of a sheet conveyor in an image forming apparatus, according to an embodiment of the present disclosure.

The measurement section 111 includes an encoder and a transmissive sensor 701 (see FIG. 7). The measurement section 111 serves as a sensor that measures the rotational speed of the heat pipe roller 104.

The controller 110 serves as a controller that controls the conveyance of the sheet by the first conveyor 112. The controller 110 controls the linear speed of conveyance of a sheet by the first conveyor 112 based on the rotational speed of the heat pipe roller 104 measured by the measurement section 111. In other words, the controller 110 controls the first conveyor 112 to convey the sheet at a target linear speed based on the rotational speed measured by the second sensor (e.g., the measurement section 111).

The controller 110 controls the first roller (e.g., the detection upstream roller 103) and the second roller (e.g., the detection downstream roller 101) to convey the sheet at the target linear speed based on the rotational speed measured by the second sensor (e.g., the measurement section 111).

In the present embodiment, as illustrated in FIG. 1C, the controller 110 includes a detection time calculation unit 110*a*, a counter unit 110*b*, an average calculation unit 110*c*, a correction unit 110*d*, and an abnormality detection unit 110*e*. The detection time calculation unit 110*a* calculates the number of filler detection for the filler 702 (see FIG. 7) based on the signal indicating the rotational speed of the heat pipe roller 104 detected by the measurement section 111. The detection time calculation unit 110*a* obtains the time (or detection time) from the first detection of the filler 702 to the second detection of the filler 702. The counter unit 110*b* calculates the number of detections where the detection time falls within the target range relative to the target time. The average calculation unit 110*c* calculates an average time of the obtained detection times when the number of detections is a predetermined number or more. The correction unit 110*d* calculates a correction value for the calculated average time relative to the target time and changes the set value of the rotational speed of the driving section (e.g., the driving roller 107) of the first conveyor 112 based on the calculated correction value to control the linear speed of conveyance of a sheet by the first conveyor 112. This configuration measures any linear speed variations on the surface over which the sheet passes, and correct these variations to the target linear speed, irrespective of part differences and changes over time in the conveyor rubber belt 105. As a result, the stability of the linear speed of the paper conveyor using the conveyor rubber belt 105 and the heat pipe roller 104 can be enhanced, and the accuracy of image positioning and detection functions for, for example, a sheet can be increased. Further, the controller 110 may control the conveyance of a sheet by the detection downstream roller 101 and the detection upstream roller 103 based on the rotational speed of the heat pipe roller 104 measured by the measurement section 111. When the result detected by the measurement section 111 is significantly off from the target value, the abnormality detection unit 110*e* may perform abnormality processing to identify an abnormality in the first conveyor 112. More specifically, the abnormality detection unit 110*e* calculates the number of non-detections where the detection time does not fall within the target range relative to the target time. Then, when the number of non-detection reaches a predetermined number of times, the abnormality detection unit 110*e* may detect an abnormality in the first conveyor 112 as the abnormality processing.

Figure 2:
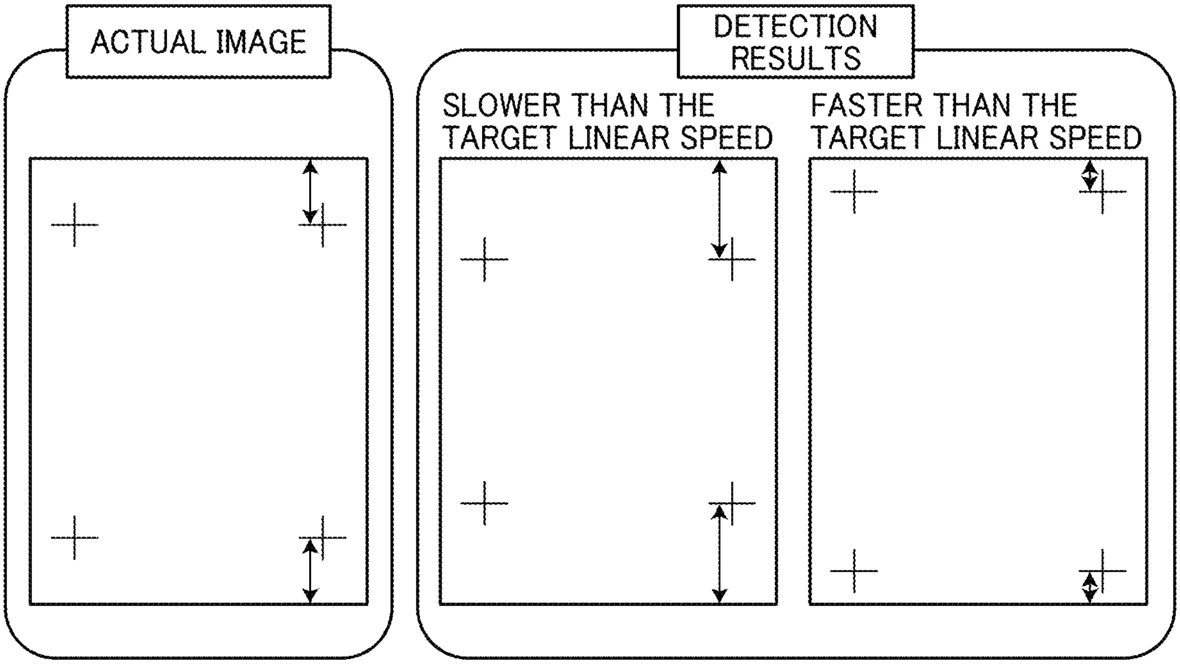
FIG. 2 is a diagram illustrating how the position of images is detected by an image forming apparatus according to an embodiment of the present disclosure.

FIG. 2 is a diagram illustrating how the position of images is detected by an image forming apparatus according to an embodiment of the present disclosure. The detector 102 measures the difference in arrival time between the leading edge of the sheet to the leading edge of the image and the difference in arrival time between the trailing edge of the sheet to the trailing edge of the image during the conveyance of the sheet. The detector 102 multiplies each arrival time by the target linear speed to calculate the distance between the leading edge of the sheet to the leading edge of the image and the distance between the trailing edge of the sheet to the trailing edge of the image. This process detects the position of the image on the sheet.

In this configuration, when the linear speed of the sheet being detected by the detector 102 is slower than the target linear speed, the detector 102 detects an image longer than the actual image. Further, when the linear speed of the sheet being detected by the detector 102 is faster than the target linear speed, the detector 102 detects an image shorter than the actual image. A deviation in the linear speed of the sheet affects the detection accuracy of the position of the image. To minimize the effect on the detection accuracy, variations in the linear speed of the sheet is reduced.

Figure 3:
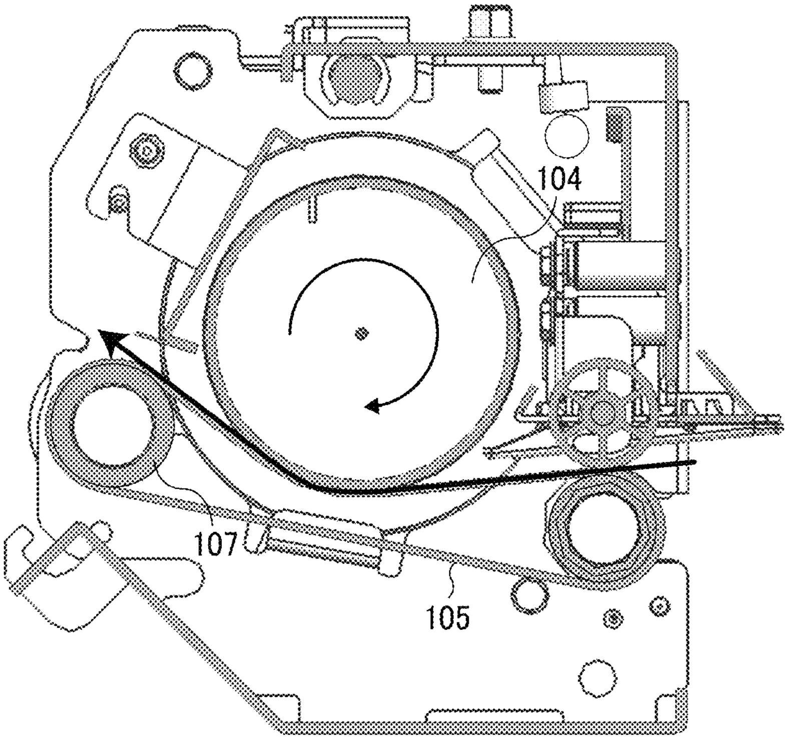
FIG. 3 is a diagram of a part of a cooler included in an image forming apparatus, according to an embodiment of the present disclosure.

FIG. 3 is a diagram of a part of a cooler included in an image forming apparatus 1000, according to an embodiment of the present disclosure; In the image forming apparatus according to the present embodiment, the driving roller 107 and the driven roller 108 are located inside the loop of the conveyor rubber belt 105. A nip is formed between the conveyor rubber belt 105 and the heat pipe roller 104 by winding the conveyor rubber belt 105 around the heat pipe roller 104 having a large diameter. By winding the conveyor rubber belt 105 around the heat pipe roller 104, a nip wider than the nip between the heat pipe roller 104 and the rubber roller can be formed. This allows the sheet to be in contact with the heat pipe roller 104 for a longer time, achieving higher cooling performance.

However, since a thin rubber belt is used as a driving section for the conveyor rubber belt 105, variations in the linear speed of the sheet, which is the linear speed variation described in Table 1, might occur due to, for example, rotation unevenness, environmental factors, changes over time, and differences in components as illustrated in Table 1 below.

TABLE 1

| ITEM | CONTENT | LINEAR SPEED VARIATION |
|---|---|---|
| ROTATION UNEVENNESS | VARIATION IN ROTATION OF THE DRIVE CONFIGURATION | 0.05% |
| ENVIRONMENT | ENVIRONMENTAL CHANGES SUCH AS TEMPERATURE CHANGES | 0.23% |
| OVER TIME | TIME-DEPENDENT DETERIORATION OF COMPONENTS | 0.24% |
| COMPONENT | DIMENSIONS OF COMPONENTS | 1.74% |

In conveyance using a thin conveyor rubber belt 105, variations in linear speed due to, for example, the rotation unevenness, environmental factors, changes over time, and component differences, particularly due to the thickness and circumference of the conveyor rubber belt 105. Further, the expansion and wear of the conveyor rubber belt 105 change due to environmental factors and changes over time.

Figure 4B:
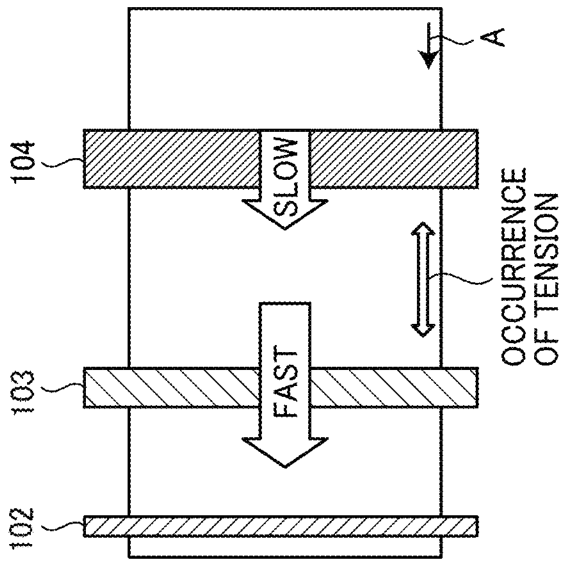
FIGS. 4A and 4B are diagram illustrating the reason why variations in linear speed affect the linear speed of paper in an image forming apparatus according to an embodiment of the present disclosure.
Figure 4A:
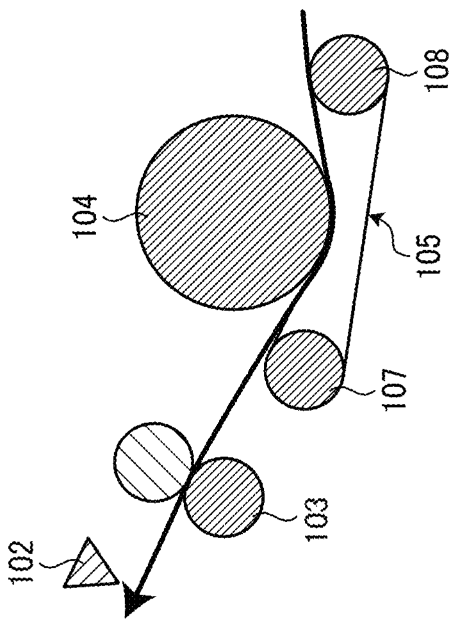

FIGS. 4A and 4B are diagram illustrating the reason why variations in linear speed affect the linear speed of paper in an image forming apparatus according to an embodiment of the present disclosure. With the occurrence of differences in the linear speed of the sheet (i.e., the linear speed difference) between the detection upstream roller 103 and the heat pipe roller 104, e.g., when the linear speed of the sheet at the detection upstream roller 103 is higher that of the heat pipe roller 104, tension in the sheet is created between the detection upstream roller 103 and the heat pipe roller 104, affecting its linear speed.

Figure 5:
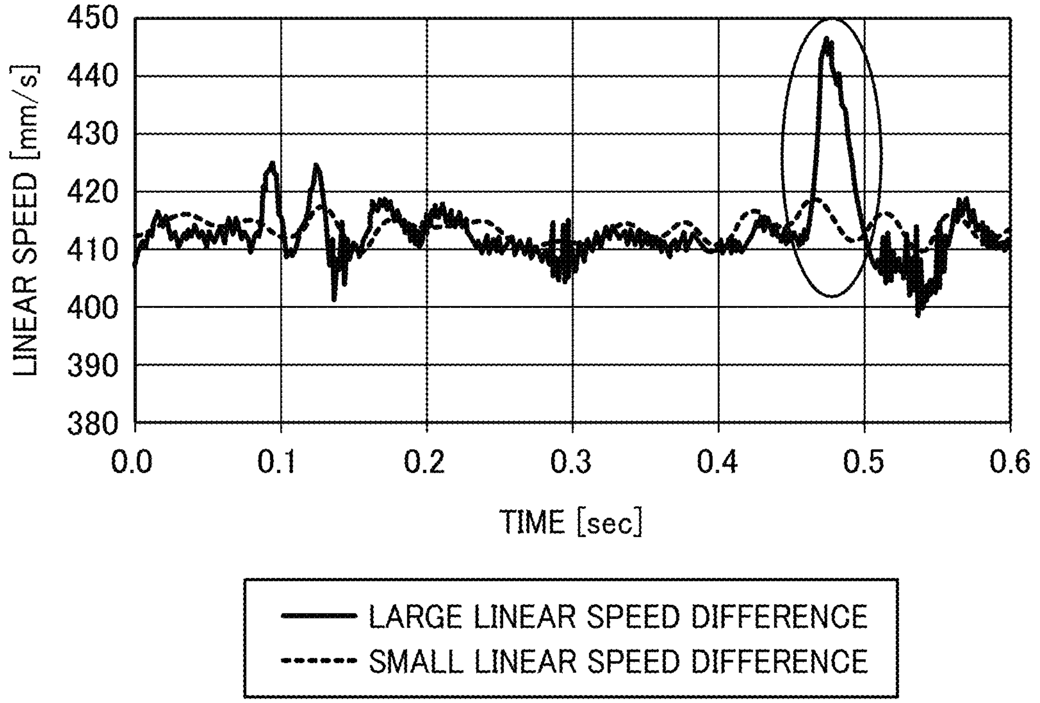
FIG. 5 is a graph presenting the evaluation results of linear speed in an image forming apparatus according to an embodiment of the present disclosure.

FIG. 5 is a graph presenting the evaluation results of linear speed in an image forming apparatus 1000 according to an embodiment of the present disclosure. In FIG. 5, the vertical axis represents linear speed, and the horizontal axis represents time. With an increasing linear speed difference, the tension in the sheet becomes stronger, and the linear speed of the sheet significantly fluctuates when the trailing edge of the sheet exits the heat pipe roller 104. This causes the detection result of the image position to deviate from the target position. In view of the above, the linear speed differences between the upstream and downstream rollers in the conveyance direction A is adjusted to prevent such linear speed fluctuations.

Figure 6:
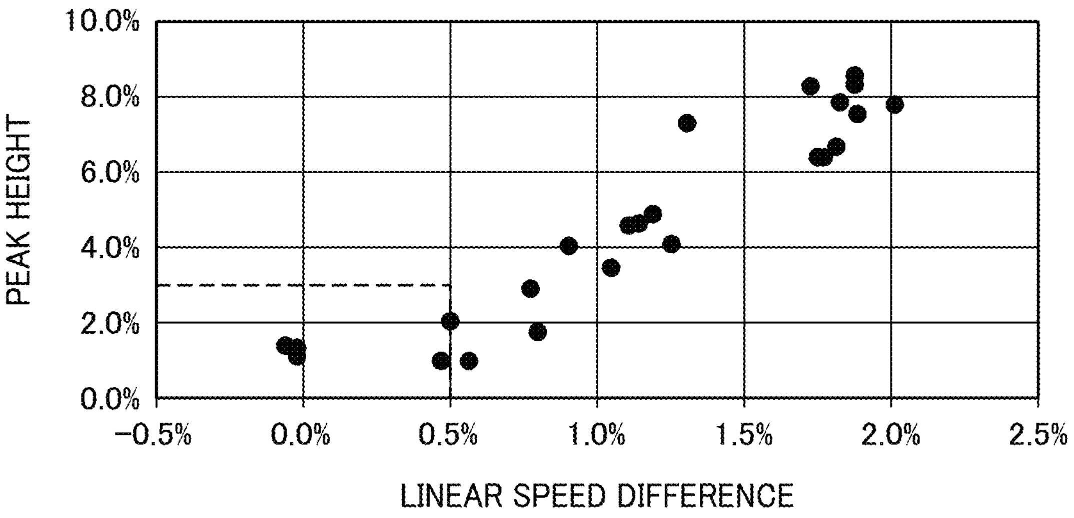
FIG. 6 is a graph presenting the relation between the permissible value of the linear speed differences and the peak height of the linear speed fluctuations in the image forming apparatus according to an embodiment of the present disclosure.

FIG. 6 is a graph presenting the relation between the permissible value of the linear speed differences and the peak height of the linear speed fluctuations in the image forming apparatus 1000 during to an embodiment of the present disclosure. In FIG. 6, the vertical axis represents the peak height of the linear speed fluctuation, and the horizontal axis represents the linear speed difference. As a permissible value for the linear speed differences, when the peak height of the linear speed fluctuations is maintained below 3.0%, almost no effect is observed on the detection accuracy of the image position. Consequently, the linear speed difference is to be 0.5%.

FIG. 7 is a diagram of parts of a sheet conveyor 100 in an image forming apparatus 1000, according to an embodiment of the present disclosure. A method to achieve the above objective involves installing the transmissive sensor 701 and the filler 702 on the heat pipe roller 104, which serves as a driven roller, and measuring the rotational speed of the heat pipe roller 104 by the measurement section 111. The controller 110 controls the conveyance of a sheet by the first conveyor 112 based on the measurement results, e.g., the rotational speed of the heat pipe roller 104, measured by the measurement section 111. This configuration measures any linear speed variations on the surface over which the sheet passes, and correct these variations to the target linear speed, irrespective of part differences and changes over time in the conveyor rubber belt 105. In the present configuration, the linear speed difference can be stably adjusted by periodically measuring the linear speed of the surface of the conveyor rubber belt 105. Thus, the position of the image can be detected with high accuracy.

The measurement section 111 including the transmissive sensor 701 may measure the rotational speed for each rotation of the heat pipe roller 104. This allows for the measurement of the rotational speed and the correction of the linear speed of a sheet using a more simple detector, rather than an encoder that constantly measures the rotational speed with high accuracy.

Figure 8:
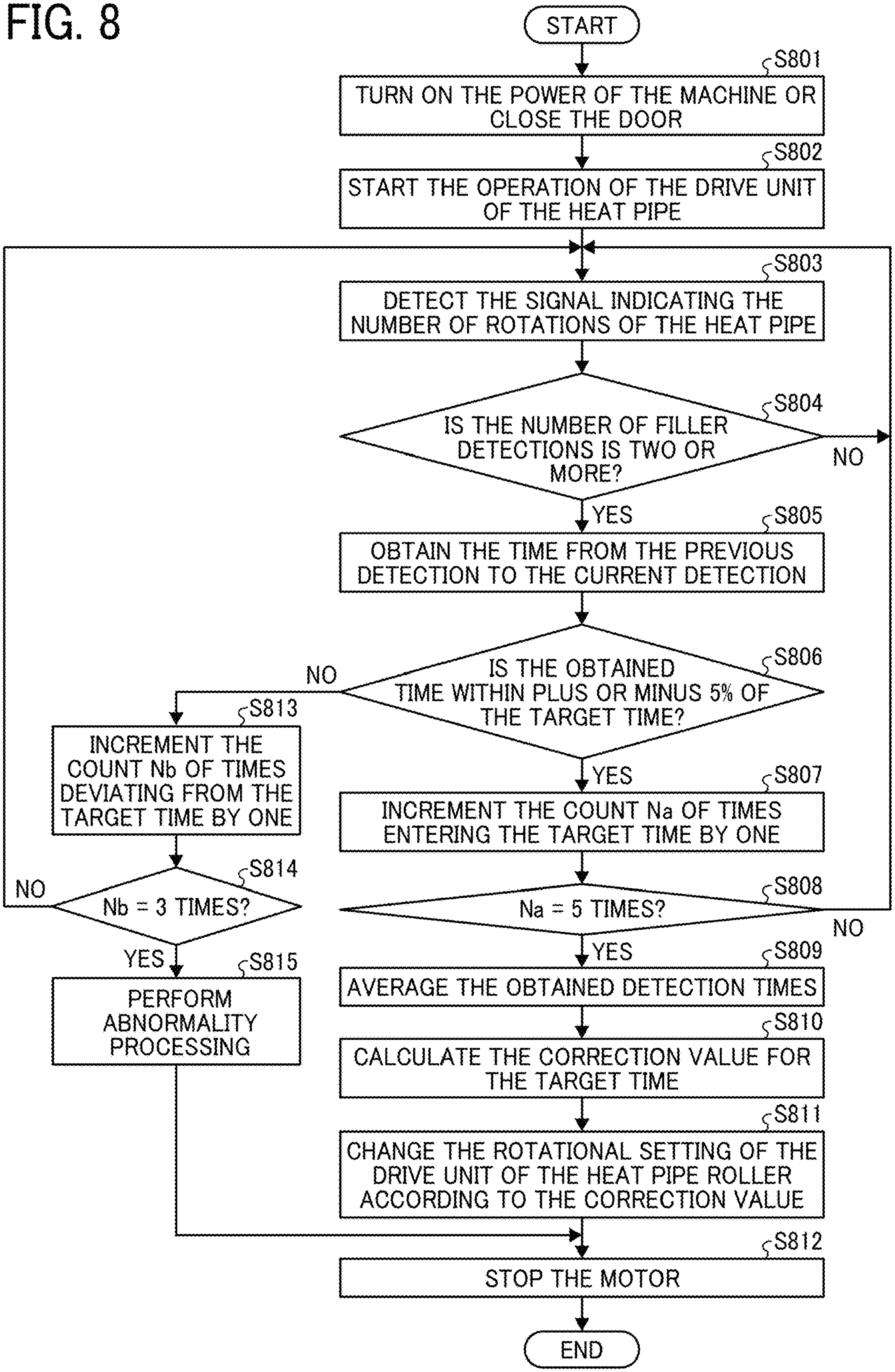
FIG. 8 is a flowchart of a process of controlling the linear speed of a first conveyor of an image forming apparatus, according to an embodiment of the present disclosure.

FIG. 8 is a flowchart of a process of controlling the linear speed of a first conveyor of an image forming apparatus 1000, according to an embodiment of the present disclosure. In the present embodiment, when the power of the machine such as the image forming apparatus or the sheet conveyor is turned on or the door is closed (step S801), the controller 110 starts driving the driving roller 107 (or the driving section) for rotating the heat pipe roller 104 in step S802. Then, the controller 110 detects a signal indicating the rotational speed of the heat pipe roller 104 using the measurement section 111 in step S803.

The detection time calculation unit 110*a* determines whether the number of filler detections is two or more based on the signal detected by the measurement section 111 in step S804. When the number of filler detections is two or more (YES in step S804), the detection time calculation unit 110*a* obtains the time (or the detection time) from the first detection of the filler 702 to the second detection of the filler 702 in steps S805. Then, the counter unit 110*b* determines whether the detection time (or the obtained time) is within the target range (for example, ±5%) relative to the target time in step S806.

When the detection time is within the target range relative to the target time (Yes in step S806), the counter unit 110*b* increments the detection count Na (or the number of detections) in step S807. Subsequently, the average calculation unit 110*c* determines whether the detection count Na has reached a predetermined number of times (for example, five times) in step S808.

When the detection count Na reaches the predetermined number of times (YES in step S808), the average calculation unit 110*c* obtains an average value for the obtained detection times in step S809. The correction unit 110*d* calculates a correction value for the target time of the average value in step S810. Further, the correction unit 110*d* changes the setting value of the rotational speed of the driving roller 107 of the heat pipe roller 104 based on the calculated corrected value in step S811. Thereafter, the controller 110 stops the driving roller 107 in step S812.

When the detection time is not within the target range relative to the target time (NO in step S806), the abnormality detection unit 110*e* increments the non-detection count Nb where the detection time is not within the target range relative to the target time in step S813. Subsequently, the abnormality detection unit 110*e* determines whether the non-detection count Nb has reached a predetermined number of times (for example, three times) in step S814. When the non-detection count Nb reaches the predetermined number (Yes in step S814), the abnormality detection unit 110*e* detects an abnormality of the first conveyor 112 as abnormality processing in step S815, and the process proceeds to step S812.

The image forming apparatus 1000 of the present embodiment measures the rotational speed of the heat pipe roller 104 to detect any linear speed variations on the surface over which the sheet passes, and correct these variations to the target linear speed, irrespective of part differences and changes over time in the conveyor rubber belt 105. As a result, the stability of the linear speed of the paper conveyor using the conveyor rubber belt 105 and the heat pipe roller 104 can be enhanced, and the accuracy of image positioning and detection functions for, for example, a sheet can be increased.

Note that in the embodiments described above, the image forming apparatus is described as an MFP having at least two of copying, printing, scanning, and facsimile functions. Alternatively, the image forming apparatus may be, e.g., a copier, a printer, a scanner, or a facsimile machine.

Aspects of the present disclosure are, for example, as follows.

Aspect 1

An image forming apparatus includes: a first sensor (e.g., a detector) to detect at least one of a position of an image on a sheet or a length of the sheet; a first conveyor upstream or downstream of the first sensor in a conveyance direction; a fixing device; and a controller. The first conveyor conveys the sheet in the conveyance direction using a rubber belt and includes: a driving roller; a driven roller to rotate with a rotation of the driving roller using the rubber belt; and a second sensor (e.g., a measurement section) to measure a rotational speed of the driven roller. The fixing device upstream of the first conveyor in the conveyance direction, the fixing device to fix toner onto the sheet. The controller controls linear speed of conveyance of the sheet by the first conveyor based on the rotational speed measured by the second sensor.

Aspect 2

The image forming apparatus according to Aspect 1, the first conveyor is upstream of the first sensor (e.g., the detector) in the conveyance direction, and the fixing device is upstream of the first conveyor in the conveyor direction.

Aspect 3

In the image forming apparatus according to Aspect 1 or 2, the first conveyor includes a cooler to cool the sheet.

Aspect 4

The image forming apparatus according to any one of Aspect 1 to Aspect 3, further includes a second conveyor (e.g., a detection downstream roller and a detection upstream roller), which are disposed upstream and downstream of the first sensor (e.g., the detector) in the conveyance direction. The second conveyer conveys the sheet in the conveyance direction using only rollers. The controller is further configured to control a linear speed of conveyance of the sheet by the rollers.

Aspect 5

In the image forming apparatus according to any one of Aspect 1 to Aspect 4, the second sensor (e.g., the measurement section) measures the rotational speed for each rotation of the driven roller.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An image forming apparatus comprising:

a first sensor to detect at least one of a position of an image on a sheet or a length of the sheet;

a first conveyor upstream or downstream of the first sensor in a conveyance direction, the first conveyor including:

a rubber belt;

a driving roller within the rubber belt to rotate the rubber belt;

a driven roller outside the rubber belt and driven by the rubber belt to convey the sheet in the conveyance direction; and a second sensor to measure a rotational speed of the driven roller;

a fixing device upstream of the first conveyor in the conveyance direction, the fixing device to fix toner onto the sheet; and circuitry configured to control the first conveyor to convey the sheet at a target linear speed based on the rotational speed measured by the second sensor.

2. The image forming apparatus according to claim 1, wherein:

the first conveyor is upstream of the first sensor in the conveyance direction, and the fixing device is upstream of the first conveyor in the conveyance direction.

3. The image forming apparatus according to claim 2, wherein;

the first conveyor includes a cooler to cool the sheet heated by the fixing device.

4. The image forming apparatus according to claim 1, further comprising:

a second conveyor including:

a first roller upstream of the first sensor in the conveyance direction; and a second roller downstream of the first sensor in the conveyance direction, wherein:

the first roller and the second roller convey the sheet in the conveyance direction, and the circuitry is further configured to control the first roller and the second roller to convey the sheet at the target linear speed based on the rotational speed measured by the second sensor.

5. The image forming apparatus according to claim 1, wherein;

the second sensor measures the rotational speed for each rotation of the driven roller.

* * * * *